United States Patent
Kneale et al.

(10) Patent No.: US 6,677,265 B1
(45) Date of Patent: Jan. 13, 2004

(54) PROCESS OF PRODUCING SELF-SUPPORTED CATALYSTS

(75) Inventors: Brian Kneale, Baton Rouge, LA (US); James E. Boone, Baton Rouge, LA (US); Steven P. Diefenbach, Baton Rouge, LA (US); Cecil P. Loechelt, Baton Rouge, LA (US); John C. Prindle, Jr., Baton Rouge, LA (US)

(73) Assignee: Albemarle Corporation, Richmond, VA (US)

( * ) Notice: Subject to any disclaimer, the term of this patent is extended or adjusted under 35 U.S.C. 154(b) by 122 days.

(21) Appl. No.: 09/595,634

(22) Filed: Jun. 16, 2000

Related U.S. Application Data

(60) Continuation-in-part of application No. 09/571,480, filed on May 16, 2000, now Pat. No. 6,521,728, and a continuation-in-part of application No. 09/571,542, filed on May 16, 2000, now Pat. No. 6,294,496, said application No. 09/571,480, filed on May 16, 2000, is a division of application No. 08/986,824, filed on Dec. 8, 1997, now abandoned, said application No. 09/571,542, filed on May 16, 2000, is a division of application No. 08/986,824, filed on Dec. 8, 1997, now abandoned.

(51) Int. Cl.$^7$ .............................. C08F 4/02; C08F 4/64; B01J 31/00
(52) U.S. Cl. ...................... 502/108; 502/103; 502/152; 526/75; 526/165
(58) Field of Search ........................ 526/75, 165, 943; 502/103, 108, 152

(56) References Cited

U.S. PATENT DOCUMENTS

| | | | |
|---|---|---|---|
| 4,316,966 A | 2/1982 | Mineshima et al. | 525/53 |
| 4,335,016 A | 6/1982 | Dombro | 252/429 B |
| 4,675,369 A | 6/1987 | Cook et al. | 526/129 |
| 4,701,432 A | 10/1987 | Welborn, Jr. | 502/113 |
| 4,752,597 A | 6/1988 | Turner | 502/104 |

(List continued on next page.)

FOREIGN PATENT DOCUMENTS

| | | |
|---|---|---|
| AT | 366706 B | 5/1982 |
| EP | 0142143 | 5/1985 |
| EP | 0476835 | 3/1992 |
| EP | 0586167 | 3/1994 |
| EP | 0586168 | 3/1994 |
| EP | 0619325 | 10/1994 |
| EP | 0659773 | 6/1995 |
| EP | 0685495 | 12/1995 |
| EP | 0703246 | 3/1996 |
| EP | 0751155 | 1/1997 |
| EP | 0780404 | 6/1997 |
| JP | 61176611 A2 | 8/1986 |
| JP | 02053811 A2 | 2/1990 |
| JP | 03197515 A2 | 8/1991 |
| JP | 04063081 B4 | 10/1992 |
| JP | 05022725 B4 | 3/1993 |
| JP | 06062704 B4 | 8/1994 |
| JP | 06228211 A | 8/1994 |
| JP | 07064893 B4 | 7/1995 |
| JP | 08134124 A2 | 5/1996 |
| JP | 09143221 A2 | 6/1997 |
| JP | 10310607 A2 | 11/1998 |
| JP | 10310667 A2 | 11/1998 |
| JP | 2000007722 A2 | 1/2000 |
| WO | 9518836 | 7/1995 |
| WO | 9526369 | 10/1995 |
| WO | 9607680 | 3/1996 |
| WO | 9608520 | 3/1996 |
| WO | 9634020 | 10/1996 |
| WO | 9729138 | 8/1997 |
| WO | 9733920 | 9/1997 |
| WO | 9844011 | 10/1998 |
| WO | 9852686 | 11/1998 |
| WO | 9928353 | 6/1999 |
| WO | 9929738 | 6/1999 |
| WO | 9932530 | 7/1999 |
| WO | 9935174 | 7/1999 |
| WO | 0014129 | 3/2000 |
| ZA | 9106621 A | 4/1993 |

OTHER PUBLICATIONS

CAPLUS Abstract of Wang et al., "Long Chain Branching in Ethylene Polymerization Using Binary Homogeneous Metallocene Catalyst System", Polym. React. Eng., 1999, Vol 7(3), pp. 327–346.

CAPLUS Abstract of Wang et al., "Long–chain Branching in Ethylene Polymerization Using Constrained Geometry Metallocene Catalyst", Macromol. Chem. Phys., 1998, Vol 199(11), pp. 2409–2416.

CAPLUS Abstract of Wang et al., "Kinetics of Long Chain Branching in Continuous Solution Polymerization of Ethylene Using Constrained Geometry Metallocene", Macromolicules, 1998, Vol 31(25), pp. 8677–8683.

(List continued on next page.)

*Primary Examiner*—Caixia Lu
(74) *Attorney, Agent, or Firm*—Edgar E. Spielman, Jr.

(57) ABSTRACT

The process features concurrent feeds into the liquid phase of a prepolymerization reaction mixture. These feeds are:

a) separate continuous or substantially continuous feeds of (i) a polymerizable vinylolefin, and (ii) a solution in an organic liquid solvent of a metallocene and an aluminoxane and/or metallocene-aluminoxane reaction product; or b) separate continuous or substantially continuous feeds of (i) a polymerizable vinylolefin, (iii) a metallocene optionally in an organic liquid solvent or diluent, and (iv) an aluminoxane optionally in an organic liquid solvent or diluent; or c) separate continuous or substantially continuous feeds of (i) and (ii) and at least one of (iii) and (iv).

Particles of catalytically-active, prepolymerized, self-supported olefin polymerization catalyst composition are formed in the reaction medium. The metallocene used as the feed or in making up the feed has at least one polymerizable olefinic substituent in the molecule.

54 Claims, No Drawings

U.S. PATENT DOCUMENTS

| | | | |
|---|---|---|---|
| 4,767,735 A | 8/1988 | Ewen et al. | 502/109 |
| 4,791,180 A | 12/1988 | Turner | 526/160 |
| 4,871,705 A | 10/1989 | Hoel | 502/117 |
| 4,892,851 A | 1/1990 | Ewen et al. | 502/104 |
| 4,908,463 A | 3/1990 | Bottelberghe | 556/179 |
| 4,923,833 A | 5/1990 | Kioka et al. | 502/9 |
| 4,924,018 A | 5/1990 | Bottelberghe | 556/179 |
| 4,939,217 A | 7/1990 | Stricklen | 526/114 |
| 4,975,403 A | 12/1990 | Ewen | 502/113 |
| 4,978,730 A | 12/1990 | Maezawa et al. | 526/153 |
| 5,001,205 A | 3/1991 | Hoel | 526/128 |
| 5,003,095 A | 3/1991 | Beard | 556/179 |
| 5,017,714 A | 5/1991 | Welborn, Jr. | 556/12 |
| 5,041,583 A | 8/1991 | Sangokoya | 556/179 |
| 5,066,631 A | 11/1991 | Sangokoya et al. | 502/152 |
| 5,071,808 A | 12/1991 | Antberg et al. | 502/107 |
| 5,099,050 A | 3/1992 | Sangokoya | 556/179 |
| 5,106,804 A | 4/1992 | Bailly et al. | 502/108 |
| 5,120,867 A | 6/1992 | Welborn, Jr. | 556/12 |
| 5,124,418 A | 6/1992 | Welborn, Jr. | 526/114 |
| 5,126,301 A | 6/1992 | Tsutsui et al. | 502/108 |
| 5,145,819 A | 9/1992 | Winter et al. | 502/117 |
| 5,153,157 A | 10/1992 | Hlatky et al. | 502/117 |
| 5,157,008 A | 10/1992 | Sangokoya et al. | 502/111 |
| 5,157,137 A | 10/1992 | Sangokoya | 556/179 |
| 5,169,818 A | 12/1992 | Antberg et al. | 502/159 |
| 5,198,401 A | 3/1993 | Turner et al. | 502/155 |
| 5,227,440 A | 7/1993 | Canich et al. | 526/129 |
| 5,229,478 A | 7/1993 | Floyd et al. | 526/160 |
| 5,235,081 A | 8/1993 | Sangokoya | 556/179 |
| 5,240,894 A | 8/1993 | Burkhardt et al. | 502/108 |
| 5,248,801 A | 9/1993 | Sangokoya | 556/179 |
| 5,276,208 A | 1/1994 | Winter et al. | 556/53 |
| 5,283,300 A | 2/1994 | Haspeslagh et al. | 526/75 |
| 5,308,815 A | 5/1994 | Sangokoya | 502/104 |
| 5,308,816 A | 5/1994 | Tsutsui et al. | 502/108 |
| 5,308,817 A | 5/1994 | Reddy et al. | 502/117 |
| 5,371,260 A | 12/1994 | Sangokoya | 556/171 |
| 5,387,567 A | 2/1995 | Tajima et al. | 502/103 |
| 5,393,851 A | 2/1995 | Ewen et al. | 526/153 |
| 5,462,999 A | 10/1995 | Griffin et al. | 526/68 |
| 5,466,766 A | 11/1995 | Patsidis et al. | 526/129 |
| 5,492,978 A | 2/1996 | Peifer et al. | 525/362 |
| 5,498,581 A | 3/1996 | Welch et al. | 502/102 |
| 5,527,930 A | 6/1996 | Sangokoya | 556/179 |
| 5,541,270 A | 7/1996 | Chinh et al. | 526/68 |
| 5,541,350 A | 7/1996 | Murata et al. | 556/10 |
| 5,585,508 A | 12/1996 | Kuber et al. | 556/11 |
| 5,643,845 A | 7/1997 | Tajima et al. | 502/103 |
| 5,648,310 A | 7/1997 | Wasserman et al. | 502/120 |
| 5,712,352 A | 1/1998 | Brant et al. | 526/68 |
| 5,714,425 A | 2/1998 | Chabrand et al. | 502/117 |
| 5,726,264 A | 3/1998 | Jung et al. | 502/170 |
| 5,733,834 A | 3/1998 | Soga et al. | 502/117 |
| 5,739,368 A | 4/1998 | Krzystowczyk et al. | 556/187 |
| 5,747,405 A | 5/1998 | Little et al. | 502/113 |
| 5,759,940 A | 6/1998 | Sacchetti et al. | 502/134 |
| 5,770,755 A | 6/1998 | Schertl et al. | 556/43 |
| 5,854,363 A | 12/1998 | Jung et al. | 526/160 |
| 5,883,275 A | 3/1999 | Bingel et al. | 556/9 |
| 5,919,877 A | 7/1999 | Tanaglia | 526/153 |
| 6,166,152 A * | 12/2000 | Benham et al. | 526/64 |
| 6,166,153 A * | 12/2000 | Shamshoum et al. | 526/64 |
| 6,187,880 B1 * | 2/2001 | Welch et al. | 526/75 |

OTHER PUBLICATIONS

CAPLUS Abstract of Bergemann, et al., "Carrier–bound Metallocene Catalyst For High–Pressure Polymerization of Ethylene", Chem. Ing. Tech., 1998, vol. 70(1–2), pp. 174–176.

CAPLUS Abstract of Bergemann, et al., Immobilized Metallocene Catalyst in the Polymerization of Ethylene Under High Pressure:, Chem. Eng. Technol., 1998, vol 21(1), pp. 33–36.

CAPLUS Abstract of Charpentier et al., "Continuous Solution Polymerization of Ethylene Using Metallocene Catalyst System Zirconocene Dichloride/Metallocene–methylaluminoxane/trimethylaluminum" Ind. Eng. Chem. Res., 1997, vol. 36(12), pp. 5074–5082.

CAPLUS Abstract of Choi, "Control of molecular weight distribution of polyethylene in continuous stirred tank reactors with high activity soluble Ziegler–type catalysts", J. Appl. Polym. Sci., 1985, vol 30(6), pp. 2707–2710.

CAPLUS Abstract of Kabanov, et al., "Gel–immobilized metal–complex catalytic systems. Report 2. Polymerization of ethylene",Deposited Doc., 1980, VINITI 2291–80, 37 pp.

Braca, G. et al., "Organometallic nickel catalysts bound to polymeric matrices in the oligomerization and/or polymerization of olefins with a replica of the support morphology", J. Mol. Catal. (1992), 74, pp. 421–431.

Braca, G. et al., "Organometallic nickel catalysts anchored on polymeric matrices in the oligomerization and/or polymerization of olefins. Part II. Effect and role of the components of the catalytic system", J. Mol. Catal. A: Chem. (1995), 96, pp. 203–213.

Xie, Tuyu, et al., "Gas Phase Ethylene Polymerization: Production Processes, Polymer Properties, and Reactor Modeling", Ind. Eng. Chem. Res. (1994), 33, pp. 449–479.

Antberg, M. et al., "Stereospecific polymerization with metallocene catalysts: products and technological aspects", Makromol. Chem., Macromol. Symp. (1991), 48/49, pp. 333–347.

* cited by examiner

PROCESS OF PRODUCING SELF-SUPPORTED CATALYSTS

REFERENCE TO RELATED APPLICATIONS

This is a continuation-in-part of commonly owned U.S. application Ser. No. 09/571,480, filed May 16, 2000, now U.S. Pat. No. 6,521,728, and Ser. No. 09/571,542, filed May 16, 2000, now U.S. Pat. No. 6,294,496 B1. Said application Ser. No. 09/571,480 is in turn a Division of commonly-owned prior application Ser. No. 08/986,824, fled Dec. 8, 1997, now abandoned. Said application Ser. No. 09/571,542 is in turn a Continuation-in-part of commonly-owned prior application Ser. No. 08/986,824 filed Dec. 8, 1997, now abandoned. Reference is made to commonly-owned U.S. application Ser. No. 09/596,953, filed Jun. 16, 2000, now U.S. Pat. No. 6,606,104 and Ser. No. 09/595,628, filed Jun. 16, 2000.

TECHNICAL FIELD

This invention relates to process technology for producing particulate aluminoxane/metallocene olefin polymerization catalysts which are devoid of preformed supports.

BACKGROUND

Hydrocarbylaluminoxanes (also known as alumoxanes) complexed with transition metal compounds, such as metallocenes, have been found to be effective olefin polymerization catalysts. Methylaluminoxanes are especially effective catalyst components in forming homogeneous catalyst systems with various metallocenes. However, these catalyst systems have proven to be considerably less effective in productivity per unit weight of catalyst when used as supported heterogeneous catalysts, either in the form of dispersions in a liquid medium or as supported solid catalysts in gas-phase polymerizations. For example, in U.S. Pat. No. 5,126,301 issued Jun. 30, 1992 to Tsutsui et al. it is pointed out that when an olefin is polymerized or copolymerized in a dispersion or gas-phase polymerization system by utilizing carrier-supported metallocene-aluminoxane catalysts, polymerization activity is markedly reduced, that the properties inherent to the catalyst comprising the transition metal compound and the aluminoxane catalyst component are not fully exerted, and that powder properties such as bulk density of the thus prepared polymer were insufficient. The approach taken by Tsutsui et al. was to form a solid catalyst by contacting an α-olefin with a mixture obtained by mixing an organoaluminum compound having a branched alkyl radical, an aluminoxane of specified aluminum content, a fine-particle carrier, and a transition metal metallocene compound.

Despite various improvements made during the course of extensive research activities by various laboratories, a need has existed for olefin polymerization catalysts having even better performance characteristics. For example, U.S. Pat. No. 5,498,581 issued Mar. 12, 1996 to Welch et al., points out that evaluation of attempts disclosed in U.S. Pat. Nos. 5,240,894; 4,871,705; and 5,106,804 to overcome the disadvantages of metallocene catalysts has revealed that there is still room for improvement, particularly when the catalyst is one which is to be used in a slurry-type polymerizations. The techniques disclosed in U.S. Pat. Nos. 5,240,894; 4,871,705; and 5,106,804 involve prepolymerization of the metallocene-aluminoxane catalyst system either in the presence or absence of a support.

The improved method of Welch et al. U.S. Pat. No. 5,498,581 for preparing a solid metallocene-containing catalyst system comprises (a) combining in a liquid an organoaluminoxane and at least one metallocene having at least one cyclopentadienyl, indenyl, tetrahydroindenyl, octahydrofluorenyl, or fluorenyl ligand having at least one olefinically unsaturated substituent to form a liquid catalyst system, (b) conducting prepolymerization of at least one olefin in the presence of said catalyst system to produce a prepolymerized solid catalyst containing no more than about 95 weight percent prepolymer, and (c) separating the resulting solid from the liquid and components dissolved in the liquid. The patent reports in Table I that by use of the Welch et al. method, catalysts having productivities as high as 9840 grams of polyethylene per gram of catalyst per hour were formed.

In commonly-owned WO 99/29738 published Jun. 17, 1999 and in commonly-owned copending U.S. application Ser. No. 09/571,480, filed May 16, 2000, and Ser. No. 09/571,542, filed May 16, 2000, one of us has described solid olefin polymerization catalysts that are believed to have substantially higher productivities than any previously known heterogeneous olefin catalyst or catalyst system devoid of an inorganic support and any other kind of preformed support. Such catalysts are prepared by a process which comprises (a) mixing together in an inert hydrocarbon solvent medium at least one Group 4 metallocene having at least one polymerizable olefinic substituent in the molecule, and at least one aluminoxane, to form a catalytic solution; and (b) contacting catalytic solution from (a) with a controlled amount of vinylolefin monomer, such as ethylene, under polymerization conditions such that particulate solids are formed having a specific surface area of no more than about 20 square meters per gram ($m^2/g$). Another process described in these prior documents comprises (a) mixing together in an inert hydrocarbon solvent medium at least one Group 4 metallocene having at least one polymerizable olefinic substituent in the molecule, and at least one aluminoxane, to form a catalytic solution wherein the atom ratio of aluminum to Group 4 metal in said solution is in the range of about 150:1 to about 1500:1; and (b) contacting catalytic solution from (a) with an amount of ethylene such that the mole ratio of ethylene to Group 4 metallocene used in forming said solution is in the range of about 150:1 to about 1500:1, and under polymerization conditions such that particulate solids are formed having a productivity, when fresh and if tested for productivity, of at least 18,000 grams of polyethylene per gram of catalyst in one hour.

SUMMARY OF THE INVENTION

This invention provides improved process technology for producing particulate self-supported olefin polymerization catalysts devoid of inorganic and any other kind of preformed catalyst support, catalysts such as are described in the commonly-owned prior documents referred to above. More particularly, the process technology of this invention makes it possible to prepare particulate self-supported olefin polymerization catalysts devoid of preformed catalyst support in a batch process, or in a semi-continuous process, or in a continuous process. Moreover, while it is deemed possible to operate the processes of this invention at elevated temperatures, e.g. at 50° C. or above, the processes can be very effectively carried out at temperatures of 30° C. and below. In addition, this process technology can be adapted for efficient, economical, environmentally-friendly operation on an industrial plant scale.

For ease of reference the particulate self-supported olefin polymerization catalysts devoid of inorganic and any other kind of preformed catalyst support produced pursuant to this invention are sometimes referred to hereinafter in the singular as "prepolymerized catalyst" and in the plural as "prepolymerized catalysts".

This invention makes possible the production of prepolymerized catalysts that exhibit excellent productivity, that have desirable morphology and handling characteristics, and that are capable of producing olefin homopolymers and copolymers having desirable physical attributes and properties.

In addition, this invention makes it possible to increase reactor throughput and thereby substantially improve the economics of the operation. These advantages are realized by conducting a semi-continuous or continuous feed of metallocene-aluminoxane catalyst and aluminoxane cocatalyst into a reaction mixture containing a liquid phase to maintain a steady production of nuclei/seed particles which are grown in the process to the preferred size and prepolymer content.

This invention thus features, inter alia, concurrent continuous or substantially continuous feeds of the components used in forming the prepolymerized catalyst. These feeds are into a liquid phase in which the prepolymerization occurs, preferably under suitable relatively mild reaction conditions. Steady state operating conditions can be achieved soon after these concurrent feeds have been initiated. By maintaining the continued presence of the reaction components in appropriate proportions in the liquid phase by means of such concurrent feeds, particulate prepolymerized self-supported catalyst composition is formed in the reaction mixture substantially continuously during the concurrence of these feeds.

Accordingly, pursuant to this invention there is provided as one of its embodiments, a process which comprises concurrently feeding:

a) separate continuous or substantially continuous feeds of (i) at least one polymerizable vinylolefin, preferably at least one gaseous 1-alkene, and (ii) a solution in an organic liquid solvent of at least one metallocene and at least one aluminoxane and/or at least one metallocene-aluminoxane reaction product; or b) separate continuous or substantially continuous feeds of (i) at least one polymerizable vinylolefin, preferably at least one gaseous 1-alkene, (iii) at least one metallocene optionally in an organic liquid solvent or diluent, and (iv) at least one aluminoxane optionally in an organic liquid solvent or diluent; or c) separate continuous or substantially continuous feeds of (i) and (ii) and at least one of (iii) and (iv);

into a liquid reaction medium containing solvent and at least one vinylolefin, preferably at least gaseous 1-alkene, such that particles of catalytically-active, prepolymerized, self-supported olefin polymerization catalyst composition are formed in the reaction medium, the metallocene or at least one of the metallocenes used as the feed or in making up the feed thereof having in the molecule at least one polymerizable olefinic substituent.

The use of the term "concurrently" in connection with the processes of this invention does not exclude the possibility of inconsequential interruptions taking place during the feeds. Such interruptions, which typically are of short duration, should be such as to cause no material adverse effect upon the prepolymerization reaction or the quality of the prepolymerized catalyst being produced. Once steady state operation has been achieved, it is best to avoid interruptions in the feeds as much as possible. Nor does the term "concurrently" imply that the feeds must start at exactly the same moment in time. In the case of a co-feed process, e.g., per a) above, the feeds of (i) and (ii) can be initiated with an interval of time between such initiation as long as the interval is sufficiently short as to cause no material adverse effect upon the overall process. Likewise in the case of a tri-feed or multi-feed operation, e.g., per b) or c) above, there may be one or two different time intervals between or among the respective feeds, again provided that the time intervals are of sufficiently short duration to cause no material adverse effect upon the overall process. The feeds are into the liquid phase of a mixture of solvent and vinylolefin, preferably a gaseous 1-alkene, and thus typically the reactor is charged with these materials before initiating the concurrent continuous or substantially continuous feeds into such liquid phase. In conducting the concurrent continuous feeds where the vinylolefin being fed is a gaseous olefin, the feed can be into the vapor space above the liquid phase provided the reaction mixture is sufficiently agitated so as to ensure that the gaseous olefin comes into intimate contact with the metallocene(s) and aluminoxane(s) and/or their reaction product(s) in the liquid phase. However, it is deemed preferable to feed the gaseous vinylolefin below the surface of the liquid phase so as to facilitate the direct intimate contact between or among the aluminoxane(s) and metallocene(s) and/or aluminoxane-metallocene reaction product(s) present in the liquid phase.

Among the preferred embodiments of this invention is a process which comprises concurrently feeding separate continuous or substantially continuous feeds of (a) at least one polymerizable vinylolefin, preferably at least one gaseous 1-alkene, and (b) a solution in an organic liquid solvent of at least one metallocene and at least one aluminoxane and/or at least one metallocene-aluminoxane reaction product into a liquid reaction medium containing solvent and at least one vinylolefin, preferably at least one gaseous 1-alkene, such that particles of catalytically-active, prepolymerized, self-supported of fin polymerization catalyst composition are formed in said reaction medium, at least one metallocene used in forming the solution of (b) having in the molecule at least one polymerizable olefinic substituent and a single atom of a transition, lanthanide, or actinide metal.

Another of the preferred embodiments of this invention is a continuous process of forming particles of catalytically-active, prepolymerized, self-supported olefin polymerization catalyst composition, which process comprises:

A) concurrently feeding continuous or substantially continuous separate feeds of (a) at least one polymerizable vinylolefin, preferably at least one gaseous 1-alkene, and (b) a solution in an organic liquid solvent of at least one metallocene and at least one aluminoxane and/or at least one metallocene-aluminoxane reaction product into a liquid reaction medium in a reaction zone containing solvent and at least one vinylolefin, preferably at least one gaseous 1-alkene, such that particles of catalytically-active, prepolymerized, self-supported olefin polymerization catalyst composition are formed in said reaction medium, the metallocene or at least one of the metallocenes used in forming the solution of (b) having in the molecule at least one polymerizable olefinic substituent and a single atom of a transition, lanthanide, or actinide metal; and B) periodically and/or continuously withdrawing from the reaction zone an amount of the reaction medium and said particles of catalytically-active, prepolymerized, self-supported olefin polymerization catalyst composition at a rate sufficient to enable the concurrent feeding in A) to be maintained.

Usually the metallocenes used in the processes of this invention are Group 4 to 6 metallocenes. Preferred metallocenes are Group 4 metallocenes and of these, zirconium metallocenes (zirconocenes) are more preferred. Of the aluminoxanes, preferred are alkylaluminoxanes in which at least 80% or 90% of the total alkyl groups present are methyl groups and the remainder are alkyl groups each having in the range of 1 to about 36 carbon atoms, and more preferably each having in the range of 1 to about 8 carbon atoms. Most preferred are methylaluminoxanes.

If desired, (1) at least one Group 4–6 metal compound of the type used in forming the conventional Ziegler-Natta catalyst systems, e.g., $TiCl_3$, $TiCl_4$, $ZrCl_4$, $Ti(OC_4H_9)_3Cl$, $Ti(OC_3H_7)_2Cl_2$, $Ti(OC_3H_7)_2Br_2$, $VCl_4$, $VOCl_3$, or the like, or (2) at least on organoaluminum compound (other than an aluminoxane) of the type used in forming the conventional Ziegler-Natta catalyst systems, e.g., trimethylaluminum, triethylaluminum, triisobutylaluminum, diisobutylaluminum hydride, diethylaluminum ethoxide, diethylaluminum chloride, methylaluminum sesquichloride, or the like, or a combination of (1) and (2) can be included as components used as feeds or in the formation of feeds used in the processes of this invention. Such additional components can be fed, optionally but preferably, dissolved or slurried in an organic solvent or diluent, as one or more continuous or substantially continuous feeds into the prepolymerization reaction mixture apart from but concurrently with the separate feeds referred to above in connection with the several embodiments described above. Alternatively one or more of such additional components can be included as ingredients in one or more of the separate feeds referred to above in connection with the several embodiments described above, apart from the vinylolefin feed.

Other embodiments and features of this invention will become still further apparent from the ensuing description and appended claims.

FURTHER DETAILED DESCRIPTION
Prepolymerization Conditions

The processes of this invention, whether performed in a batch mode, semi-batch mode, or continuous mode, are preferably conducted so that such things as the prepolymerization reaction, particulate solids formation, and maintenance of specified reaction conditions occur "continuously" or at least "substantially continuously" during the time the separate concurrent continuous or substantially continuous feeds to the reaction mixture are taking place. However, it cannot be stressed strongly enough that one must not gain the impression that inconsequential interruption in one or more of such things cannot occur. Interruptions which do not materially affect the conduct of the process are not excluded from the scope of this invention. To safeguard against hypertechnical legalistic word interpretation, it has been deemed prudent to employ terms such as "substantially continuously" in describing this invention. But whatever the terms used, the process should be conducted as one of ordinary skill in the art would carry out the processes after a thorough, unbiased reading of this entire disclosure (including the claims) and in keeping with the spirit of the invention gained from such a reading.

When conducted in a batch mode or when initiating a semi-batch or continuous process, it is possible to initially charge to the empty reactor either a solids-containing heel of a prepolymerization reaction mixture from a prior prepolymerization reaction in which the prepolymerized catalyst to be formed had been formed, or a solids-free mother liquor from such a prior reaction. Such heel or mother liquor should contain solvent and some residual vinylolefin, and if necessary or desirable, a suitable amount of additional solvent and/or vinylolefin, e.g., a gaseous 1-alkene, can be added to such heel or mother liquor to ensure prompt initiation of the prepolymerization once the concurrent feeds have been started. Then the concurrent, suitably-proportioned feeds are initiated, preferably at room temperature or below, and particulate formation commences almost immediately, and in any event within a few minutes. In a batch operation, the feeds are typically continued until the reactor has been, or until the reactors have been, filled to the desired level. Usually at this point, the feeds are terminated, and the particulate prepolymerized catalyst composition product which has formed is recovered, typically by filtration, centrifugation, or decantation.

The vinylolefin and solvent used in the initial start up of the processes are preferably the same vinylolefin and solvent that will be fed in the concurrent continuous or substantially continuous feeds. However during start up it is possible to use a different vinylolefin and/or a different solvent from that or those to be used in the concurrent continuous or substantially continuous feeds. In such case, the solids and reaction mixture formed during the start up and for a suitable period thereafter will typically be discarded.

When operating in a continuous mode and once the continuous feeds have been initiated, the feeds may be adjusted in fine tuning the operation so as to establish and maintain the desired operating conditions for the steady-state operation. Such operation typically can be conducted without mishap for long periods of time before shutdown, e.g., for plant maintenance.

It can be seen therefore, whether operating in a batch mode, a semi-batch mode, or in a continuous mode, the initiation of the reaction with the utilization of either a charge of solvent and vinylolefin e.g., gaseous 1-alkene, as fresh materials or in a heel or mother liquor enables the more rapid achievement of efficient, steady-state operation than if such start up procedure is not used.

When it is desired to perform the prepolymerization as a batch process, the reaction can be performed in a stand-alone reactor of suitable capacity. The concurrent continuous or substantially continuous feeds are carried out until the contents in the reactor reach a predetermined level, at which point all or at least one of the feeds can be discontinued. In one type of semi-continuous operation, the concurrent continuous or substantially continuous feeds are into a first reactor of a series of at least two reactors connected in series. When one such reactor becomes filled to a predetermined level with the reaction mixture and the concurrent feeds into the first reactor are being continued, reaction mixture is transferred to another reactor connected downstream from the first reactor in such series of reactors. When all reactors of the series that are being used in the operation have reached capacity, one or more of the feeds are discontinued, typically the feed(s) other than the vinylolefin. In some cases, e.g., when conducting a semi-continuous operation, it is desirable after terminating the other feed(s), to continue the feed of the vinylolefin for a relatively short period of time. The foregoing batch and semi-continuous modes of operation can be converted into a continuous operation by continuously or periodically removing reaction mixture and prepolymerized catalyst from the reactor (if a stand alone reactor) or from a downstream reactor at a rate enabling the concurrent continuous or substantially continuous feeds to the reactor (if a stand alone reactor) or to an upstream reactor to be maintained. Such feeds are thus not terminated until such time as it is desired to do so, e.g., for plant maintenance or the like.

In typical, properly conducted batch operations and semi-continuous operations, during at least about 80%, and preferably during at least about 90%, of the period of time the separate feeds are being fed concurrently and continuously, particulate solids of prepolymerized catalyst are being formed. Likewise once steady-state conditions have been achieved in a continuous operation, particulate solids of prepolymerized catalyst are being formed continuously or substantially continuously during the entire period of time the concurrent separate continuous feeds are being maintained. The prepolymerized catalyst formed in such operations typically has high productivity when used in the polymerization or copolymerization of alpha-olefin monomer(s). Also such prepolymerized catalyst typically has good morphology for such use. For example, as shown hereinafter, a zirconocenemethylaluminoxane catalyst composition prepolymerized with ethylene usually gave productivities above 10,000 grams of polyethylene per gram of catalyst, and in most cases well above 20,000 grams of polyethylene per gram of catalyst. Moreover, at least 75 volume percent of the prepolymerized catalyst is in the range of about 10 to about 100 microns.

In preferred processes of this invention the prepolymerized catalyst that is being formed continuously or substantially continuously is characterized by having a particle size distribution in which 75% of the catalyst has a particle size below 70 microns (preferably below 60 microns) and 25% of the catalyst has a particle size of 70 microns (perferably 60 microns) or above, in which 50% of the catalyst has a particle size below about 60 microns (preferably below 50 microns) and 50% of the catalyst has a particle size of 60 microns (preferably 50 microns) or above, in which 25% of the catalyst has a particle size below 50 microns (preferably below 45 microns) and 75% of the catalyst has a particle size of 50 microns (preferably 45 microns) or above, and in which no more than 5%, and preferably no more than about 2%, of the catalyst has a particle size above 400 microns. More preferably, no more than 3%, and still more preferably no more than about 1%, of the catalyst has a particle size above 300 microns. All percentages given in this paragraph are volume percentages.

In particularly preferred processes of this invention the prepolymerized catalyst that is being formed continuously or substantially continuously is characterized by having a particle size distribution in which 90% of the catalyst has a particle size below 80 microns (preferably below 75 microns) and 10% of the catalyst has a particle size of 80 microns (preferably 75 microns) or above, 75% of the catalyst has a particle size below 70 microns (preferably below 60 microns) and 25% of the catalyst has a particle size of 70 microns (preferably 60 microns) or above, in which 50% of the catalyst has a particle size below about 60 microns (preferably below 50 microns) and 50% of the catalyst has a particle size of 60 microns (preferably 50 microns) or above, in which 25% of the catalyst has a particle size below 50 microns (preferably below 45 microns) and 75% of the catalyst has a particle size of 50 microns (preferably 45 microns) or above, in which 10% of the catalyst has a particle size below 15 microns (preferably below 5 microns) and 90% of the catalyst has a particle size of 15 microns (preferably 5 microns) or above, and in which no more than 5%, and preferably no more than about 2%, of the catalyst has a particle size above 400 microns. More preferably, no more than 3%, and still more preferably no more than about 1%, of the catalyst has a particle size above 300 microns. All percentages given in this paragraph are volume percentages.

In the practice of this invention in a continuous mode, one or more continuously-stirred reactors are typically employed. During operation, the reaction mixture is being continuously formed and a portion thereof is being removed from the reactor during the continuous replenishment of the reaction mixture by the incoming feeds. The reactor design should be such that the average residence time in the reactor(s) is sufficient to ensure prepolymerization with all or substantially all of the metallocene and aluminoxane ingredients and/or metallocene-aluminoxane reaction product(s) and/or adduct(s). Terms such as "continuous feed" and "continuous withdrawal" and terms of analogous import are not meant to exclude interrupted feeds or withdrawals. Generally, such interruptions are of short duration and may be suitable depending upon the scale and design of the reactor. For example, since the particulate prepolymerized catalyst will tend to settle near the bottom of the reactor, a withdrawal may be made and then stopped for a period of time to allow for precipitate build-up to occur prior to the next withdrawal. Such a withdrawal is to be considered continuous in the sense that the withdrawal does not await the completion of the reactor feeds as is characteristic of batch processes. Uninterrupted withdrawal is preferred, however.

As noted above, the particulate catalyst compositions of this invention are not made in the presence of a preformed organic or inorganic solid support. Thus the prepolymerization solution is free of any such support, and the particulate vinylolefin prepolymer-metallocene-aluminoxane catalyst compositions used in the practice of this invention are devoid or free of preformed particulate solids except possibly for trace amounts (e.g., <0.5 wt %) of solid impurities that may be present as adventitious impurities in the materials or reaction equipment used in preparing the catalyst particles.

The hydrocarbon solution in which the prepolymerization is to be performed should contain the aluminoxane and metallocene ingredients (or the reaction product(s) formed in situ therefrom) in proportions such that the atom ratio of aluminum to transition, lanthanide and/or actinide metal in the solution is in the range of about 50:1 to about 1500:1, preferably in the range of about 100:1 to about 1500:1, more preferably in the range of about 150:1 to about 1500:1, and still more preferably in the range of about 175:1 to about 1000:1.

The proportion of vinylolefin (preferably a gaseous 1-alkene, and most preferably, ethylene) to metallocene being fed to the prepolymerization reaction is in the range of about 150 to about 1500, and preferably in the range of about 175 to about 1000, moles per mole of metallocene being fed whether individually and/or in a solution with an aluminoxane and/or in the form of an aluminoxane-metallocene reaction product. Use of excessively high mole ratios of vinylolefin to at least a Group 4 metallocene can adversely affect the morphology of the catalyst particles being produced.

The prepolymerization can be conducted under relatively mild conditions. Typically, this would involve using low pressures of the olefin and relatively low temperatures designed to prevent site decomposition resulting from high concentrations of localized heat. The prepolymerization typically occurs at temperatures in the range of about −15° C. to about +110° C., but preferably the temperature is kept below about 40° C. and more preferably is in the range of about 10° to about +30° C. The process can be conducted under a wide variety of pressure conditions depending upon such factors as the temperature being used, the presence or absence of inert diluent gases such as nitrogen or argon, and the identity of the vinylolefin(s) being used. The vinylolefin(s) partial pressure is typically in the range of about 2 to about 40 psig and preferably is in the range of about 5 to about 15 psig, especially when the vinylolefin being used is a gaseous vinylolefin. The amount of prepolymer can be varied but typically would be in the range of from about 1 to about 95 wt % of the resulting prepolymerized solid catalyst system more preferably about 5 to 80 wt %. It is generally desirable to carry out the prepolymerization to at least a point where substantially all of the metallocene is in the solid rather than in the liquid since that maximizes the use of the metallocene.

In a preferred embodiment, the metallocene used has only one Group 4 metal atom per molecule, and the prepolymerization reaction is conducted at a temperature of in the range of about 10 to about 30° C.

Whenever optimum conditions have not already been established for carrying out a process of this invention under a given set of parameters selected for use, (e.g., a given mode of operation (batch, semi-continuous, continuous), particular feed materials to be used, etc.), it is desirable to perform a few preliminary pilot experiments similar to those given in the Examples hereinafter to assist in defining desirable conditions for use under such set of parameters.

After the prepolymerization, the resulting solid prepolymerized catalyst is separated from the liquid of the reaction mixture. Various techniques known in the art can be used for carrying out this step. For example, the material could be separated by filtration, decantation, or by vacuum evaporation. It is currently preferred, however, not to rely upon vacuum evaporation since it is considered desirable to remove substantially all of the soluble components in the liquid reaction product of the prepolymerization from the resulting solid prepolymerized catalyst before it is stored or used for subsequent polymerization. After separating the solid from the liquid the resulting solid is preferably washed with a hydrocarbon and then dried using high vacuum to remove substantially all the liquids and other volatile components that might still be associated with the solid.

Aluminoxanes

Hydrocarbylaluminoxanes are formed by the partial hydrolysis of hydrocarbylaluminum compounds and, especially, trialkylaluminums such as trimethylaluminum.

Hydrocarbylaluminoxanes may exist in the form of linear, cyclic, caged or polymeric structures with the simplest monomeric compounds being a tetraalkylaluminoxane such as tetramethylaluminoxane of the formula $(CH_3)_2AlOAl(CH_3)_2$, or tetraethylaluminoxane of the formula $(C_2H_5)_2AlOAl(C_2H_5)_2$. The compounds preferred for use in olefin polymerization catalysts are oligomeric materials, sometimes referred to as polyalkylaluminoxanes, which usually contain about 4 to 20 of the repeating units:

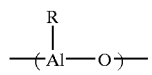

where R is $C_1$–$C_{10}$ alkyl. Especially preferred are polymethylaluminoxanes (MAOs). Although the linear and cyclic aluminoxanes are often noted as having the structures

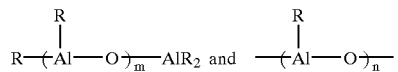

where m and n are integers of 4 or more, the exact configuration of the aluminoxanes remains unknown.

Methylaluminoxanes can contain some higher alkyl groups to improve their solubility. Such modified methylaluminoxanes are described, for example, in U.S. Pat. No. 5,157,008. Besides MAO, non-limiting examples of hydrocarbylaluminoxanes for use in the invention include ethylaluminoxane (EAO), isobutylaluminoxane (IBAO), n-propylaluminoxane, n-octylaluminoxane, and the like. The hydrocarbylaluminoxanes can also contain up to about 20 mole percent (based on aluminum) of moieties derived from amines, alcohols, ethers, esters, phosphoric and carboxylic acids, thiols, alkyl disiloxanes and the like to improve their activity, solubility and/or stability.

The aluminoxanes can be prepared as known in the art by the partial hydrolysis of trialkylaluminum compounds. The trialkylaluminum compounds can be hydrolyzed by reacting them with either free water or water containing solids, which can be either hydrates or porous materials which have absorbed water. Because it is difficult to control the reaction by adding water per se, even with vigorous agitation of the mixture, the free water is usually added in the form of a solution or a dispersion in an organic solvent. Suitable hydrates include salt hydrates such as, for example, $CuSO_4.5H_2O$, $Al_2(SO_4)_3.18H_2O$, $FeSO_4.7H_2O$, $AlCl_3.6H_2O$, $Al(NO_3)_3.9H_2O$, $MgSO_4.7H_2O$, $MgCl_2.6H_2O$, $ZnSO_4.7H_2O$, $Na_2SO_4.10H_2O$, $Na_3PO_4.12H_2O$, $LiBr.2H_2O$, $LiCl.1H_2O$, $LiI.2H_2O$, $LiI.3H_2O$, $KF.2H_2O$, $NaBr.2H_2O$ and the like and alkali metal or alkaline earth metal hydroxide hydrates such as, for example, $NaOH.H_2O$, $NaOH.2H_2O$, $Ba(OH)_2.8H_2O$, $KOH.2H_2O$, $CsOH.1H_2O$, $LiOH.1H_2O$ and the like. Mixtures of any of the above hydrates can be used. The mole ratios of free water or water in the hydrate or in porous materials such as alumina or silica to total alkyl aluminum compounds in the mixture can vary widely, such as for example from about 2:1 to 1:4, with ratios of from about 4:3 to 1:3.5 being preferred.

Such hydrocarbylaluminoxanes and processes for preparing hydrocarbylaluminoxanes are described, for example, in U.S. Pat. Nos. 4,908,463; 4,924,018; 5,003,095; 5,041,583; 5,066,631; 5,099,050; 5,157,008; 5,157,137; 5,235,081; 5,248,801, and 5,371,260, whose entire teachings are incorporated herein by reference. The methylaluminoxanes contain varying amounts, of from about 5 to 35 mole percent, of the aluminum value as unreacted trimethylaluminum. Preferably, the aluminum content as trimethylaluminum is less than about 23 mole percent of the total aluminum value, and, more preferably, less than about 20 mole percent.

The aluminoxanes can be used as supplied or they can be subjected to a heat treatment prior to being used in forming the catalyst compositions of this invention. While it may be possible to heat treat the aluminoxane while in neat form, it is preferable to heat a solution or slurry of one or more aluminoxanes, preferably methylaluminoxane, in a suitable inert anhydrous solvent such as a hydrocarbon solvent. Paraffinic and cycloparaffinic hydrocarbon solvents which can be used to form solutions or slurries of the aluminoxanes include pentane, isopentane, hexane, cyclohexane, heptane, octane, decane, dodecane, hexadecane, and the like, with those having carbon numbers of 5 to 10 being preferred. Liquid mononuclear aromatic hydrocarbons which can be used include such solvents as benzene, toluene, one or more xylenes, cumene, ethylbenzene, mesitylene, and aromatic hydrocarbon mixtures or blends such as aromatic naphthas, BTX, aromatic gasoline fractions, with those having carbon numbers of 6 to 20 being preferred. As a class, the aromatic solvents are preferred.

When utilizing previously heat-treated aluminoxanes in forming the particulate catalysts of this invention, it is desirable to use one or more aluminoxanes that have been heat treated while in a hydrocarbon solution which, before heat treatment, contains at least about 5 wt % and up to about 50 wt % or more, preferably in the range of about 10 to about 40 wt %, and more preferably in the range of about 25 to about 30 wt % of one or more hydrocarbylaluminoxanes, especially methylaluminoxane, in whatever form or composition such compounds exist while in such solution. The solvent is usually a paraffinic, cycloparaffinic and/or aromatic solvent, and most preferably is a liquid mononuclear aromatic hydrocarbon solvent (e.g., toluene or xylene). Heating the solution at a temperature of at least about 40° C. for a suitable period of time can increase the productivity of catalyst compositions of this invention made using such heat-treated aluminoxane(s). It has been observed that by heating a visually clear solution of a freshly-produced methylaluminoxane in an aromatic solvent such as toluene at a temperature of at least about 40° C., and preferably at least about 70° C., for a suitable period of time the resultant solution, when chilled to a suitably low temperature such as −15° C. for about 8 hours, will contain a visually perceptible amount of gel whereas the same methylaluminoxane solution which has not been heat treated does not exhibit visually perceptible gel formation when chilled in the same manner. Similarly, such heat treatment, if applied to an aged methylaluminoxane-toluene solution which already contains a visually perceptible amount of gel, tends to result in an increased amount of visually perceptible gel content after maintaining the heat treated solution at −15° C. for 8 hours. At present it is not known exactly what is taking place during the heating of the aluminoxane solution, or why the resultant heat-treated aluminoxane solution can increase the activity of catalyst compositions made therefrom.

Aluminoxane heat treatment temperatures in the range of about 40 up to about 130° C. are typical, and the preferred temperatures, especially when heat-treating methylaluminoxanes, are in the range of about 70 to about 90° C. The duration of the time periods during which the aluminoxane is heated will vary depending chiefly upon the temperature(s) being used and the concentration of the initial aluminoxane solution; in general the higher the temperature and/or concentration, the shorter the time. Typically the time periods will fall in the range of about 0.5 to about 72 hours and with preferred temperatures and aluminoxane concentrations, time periods in the range of about 1 to about 12 hours will normally suffice. For example, with 30 wt % methylaluminoxane solutions in toluene or equivalent aromatic solvent, heating at 80° C. for from about 2 to about 12 hours is a preferred way to operate. It will be understood that on the basis of this disclosure, departures from the foregoing ranges of temperatures, times and/or initial aluminoxane concentrations may be made whenever deemed necessary or desirable.

Metallocenes

As used in the specification and claims, the term "metallocene" includes metal derivatives which contain at least one cyclopentadienyl moiety. The metallocenes used in forming the self-supported, solid catalysts of this invention are those having at least one polymerizable olefinic substituent such as hydrocarbyl group having a terminal carbon-to-carbon double bond in the molecule. Such substituent(s) can be present (a) on a cyclopentadienyl, indenyl, fluorenyl, tetrahydroindenyl, benzoindenyl or like cyclopentadienyl-moiety-containing group of the metallocene, (b) on a bridging group linking a pair of cyclopentadienyl-moiety-containing groups together in the metallocene, (c) on the Group 4 metal atom of the metallocene, or (d) on any two or more of (a), (b), and (c). Examples of such terminal olefinically substituted metallocenes are metallocenes of the type disclosed or taught, for example, in U.S. Pat. No. 5,145,819 to Winter et. al., U.S. Pat. No. 5,169,818 to Antberg et al., U.S. Pat. No. 5,498,581 to Welch et al., and U.S. Pat. No. 5,541,350 to Murata et al., the complete disclosures of which are incorporated herein by reference.

In general the prime requirements for a metallocene to be used in the practice of this invention are that it contains in the molecule (A) at least one, and preferably only one, atom of a transition metal (i.e., a metal of Groups 3–10), a metal of the Lanthanide series, or a metal of the Actinide series, of the Periodic Table that is set forth on Page 27 of the Feb. 4, 1985 issue of Chemical & Engineering News; (B) at least one cyclopentadienyl moiety-containing group, and preferably two cyclopentadienyl moiety-containing groups; and (C) at least one, and preferably only one, polymerizable olefinic substituent such as hydrocarbyl group having a terminal carbon-to-carbon double bond.

The metallocene component used in the practice of this invention preferably contains only one atom of the transition, lanthanide and/or actinide metal per molecule, i.e., for best results the metallocene used does not contain a polymeric backbone to which are attached a plurality of metallocene moieties. A few such olefinically substituted metallocenes containing only one Group 4 metal atom per molecule include the following:

(cyclopentadienyl)(vinylcyclopentadienyl)zirconium dichloride, bis(vinylcyclopentadienyl)zirconium dichloride, bis(2,3-dimethyl-5-vinylcyclopentadienyl)zirconium dichloride, (cyclopentadienyl)(vinylcyclopentadienyl)zirconium dimethyl, bis(vinylcyclopentadienyl)zirconium dimethyl, bis(2,3-dimethyl-5-vinylcyclopentadienyl)zirconium dimethyl, (cyclopentadienyl)(vinylcyclopentadienyl)hafnium dichloride, bis(vinylcyclopentadienyl)hafnium dichloride, bis(2,3-dimethyl-5-vinylcyclopentadienyl)hafnium dichloride, (cyclopentadienyl)(vinylcyclopentadienyl)hafnium dimethyl, bis(vinylcyclopentadienyl)hafnium dimethyl, bis(2,3-dimethyl-5-vinylcyclopentadienyl)hafnium dimethyl, (divinylsilyl)bis(indenyl)zirconium dichloride (also known as divinylsilanediylbis(indenyl)zirconium dichloride), (divinylsilyl)bis(2-methylindenyl)zirconium dichloride, (divinylsilyl)bis(2-ethylindenyl)zirconium dichloride, (diallylsilyl)bis(indenyl)zirconium dichloride, (diallylsilyl)bis(2-methylindenyl)zirconium dichloride, (diallylsilyl)bis(2-ethylindenyl)zirconium dichloride, (diallylsilyl)bis(indenyl)zirconium dichloride, (methylvinylsilyl)bis(indenyl)zirconium dichloride, (methylallylsilyl)bis(indenyl)zirconium dichloride, (divinylsilyl)bis(2-methylindenyl)zirconium dimethyl, (divinylsilyl)bis(2-ethylindenyl)zirconium dimethyl, (diallylsilyl)bis(2-methylindenyl)zirconium dimethyl, (diallylsilyl)bis(2-ethylindenyl)zirconium dimethyl, (divinylsilyl)bis(2-methylindenyl)zirconium(methyl)(phenyl),
(methylvinylsilyl)bis(indenyl)zirconium dimethyl,
(methylallylsilyl)bis(indenyl)zirconium dimethyl,
(cyclopentadienyl)(vinylcyclopentadienyl)hafnium dichloride,
bis(vinylcyclopentadienyl)hafnium dichloride,
bis(2,3-dimethyl-5-vinylcyclopentadienyl)hafnium dichloride,
(cyclopentadienyl)(vinylcyclopentadienyl)hafnium dimethyl,
bis(vinylcyclopentadienyl)hafnium dimethyl,
bis(2,3-dimethyl-5-vinylcyclopentadienyl)hafnium dimethyl,
(cyclopentadienyl)(vinylcyclopentadienyl)hafnium dichloride,
bis(vinylcyclopentadienyl)hafnium dichloride,
bis(2,3-dimethyl-5-vinylcyclopentadienyl)hafnium dichloride,
(cyclopentadienyl)(vinylcyclopentadienyl)hafnium dimethyl,
bis(vinylcyclopentadienyl)hafnium dimethyl,
bis(2,3-dimethyl-5-vinylcyclopentadienyl)hafnium dimethyl,
(divinylsilyl)bis(indenyl)hafnium dichloride (also known as divinylsilanediylbis(indenyl)hafnium dichloride),
(divinylsilyl)bis(2-methylindenyl)hafnium dichloride,
(divinylsilyl)bis(2-ethylindenyl)hafnium dichloride,
(diallylsilyl)bis(indenyl)hafnium dichloride,
(diallylsilyl)bis(2-methylindenyl)hafnium dichloride,
(diallylsilyl)bis(2-ethylindenyl)hafnium dichloride,
(diallylsilyl)bis(indenyl)hafnium dichloride,
(methylvinylsilyl)bis(indenyl)hafnium dichloride,
(methylallylsilyl)bis(indenyl)hafnium dichloride,
(divinylsilyl)bis(2-methylindenyl)hafnium dimethyl,
(divinylsilyl)bis(2-ethylindenyl)hafnium dimethyl,
(diallylsilyl)bis(2-methylindenyl)hafnium dimethyl,
(diallylsilyl)bis(2-ethylindenyl)hafnium dimethyl,
(divinylsilyl)bis(2-methylindenyl)hafnium(methyl)(phenyl),
(methylvinylsilyl)bis(indenyl)hafnium dimethyl,
(methylallylsilyl)bis(indenyl)hafnium dimethyl,
(diallylamino)(methyl)silylbis(cyclopentadienyl)titanium dichloride,
(diallylamino)(phenyl)silylbis(cyclopentadienyl)titanium dichloride,
(diallylamino)(methyl)silylbis(cyclopentadienyl)titanium dimethyl,
(diallylamino)(phenyl)silylbis(cyclopentadienyl)titanium dimethyl,
bis[(diallylamino)]silylbis(cyclopentadienyl)titanium dichloride,
bis[(diallylamino)]silylbis(cyclopentadienyl)titanium dimethyl,
bis[(diallylamino)]silylbis(methylcyclopentadienyl)titanium dichloride,
bis[(diallylamino)]silylbis(methylcyclopentadienyl)titanium dimethyl,
bis[(diallylamino)]silylbis(indenyl)titanium dichloride,
bis[(diallylamino)]silylbis(indenyl)titanium dimethyl,
bis[(diallylamino)]silylbis(2-methylindenyl)titanium dichloride,
bis[(diallylamino)]silylbis(2-methylindenyl)titanium dimethyl,
bis[(diallylamino)]silylbis(entamethylcyclopentadienyl)titanium dichloride,
bis[(diallylamino)]silylbis(pentamethylcyclopentadienyl)titanium dimethyl,
(diallylamino)(methyl)silylbis(cyclopentadienyl)zirconium dichloride,
(diallylamino)phenyl)silylbis(cyclopentadienyl)zirconium dichloride,
(diallylamino)(methyl)silylbis(cyclopentadienyl)zirconium dimethyl,
(diallylamino)(phenyl)silylbis(cyclopentadienyl)zirconium dimethyl,
bis[(diallylamino)]silylbis(cyclopentadienyl)zirconium dichloride;
bis[(diallylamino)]silylbis(cyclopentadienyl)zirconium dimethyl,
bis[(diallylamino)]silylbis(methylcyclopentadienyl)zirconium dichloride,
bis[(diallylamino)]silylbis(methylcyclopentadienyl)zirconium dimethyl,
bis[(diallylamino)]silylbis(indenyl)zirconium dichloride,
bis[(diallylamino)]silylbis(indenyl)zirconium dimethyl,
bis[(diallylamino)]silylbis(2-methylindenyl)zirconium dichloride,
bis[(diallylamino)]silylbis(2-methylindenyl)zirconium dimethyl,
bis[(diallylamino)]silylbis(pentamethylcyclopentadienyl)zirconium dichloride,
bis[(diallylamino)]silylbis(pentamethylcyclopentadienyl)zirconium dimethyl,
(diallylamino)(methyl)silylbis(cyclopentadienyl)hafnium dichloride,
(diallylamino)(phenyl)silylbis(cyclopentadienyl)hafnium dichloride,
(diallylamino)(methyl)silylbis(cyclopentadienyl)hafnium dimethyl,
(diallylamino)(phenyl)silylbis(cyclopentadienyl)hafnium dimethyl,
bis[(diallylamino)]silylbis(cyclopentadienyl)hafnium dichloride,
bis[(diallylamino)]silylbis(cyclopentadienyl)hafnium dimethyl,
bis[(diallylamino)]silylbis(methylcyclopentadienyl)hafnium dichloride,
bis[(diallylamino)]silylbis(methylcyclopentadienyl)hafnium dimethyl,
bis[(diallylamino)]silylbis(indenyl)hafnium dichloride,
bis[(diallylamino)]silylbis(indenyl)hafnium dimethyl,
bis[(diallylamino)]silylbis(2-methylindenyl)hafnium dichloride,
bis[(diallylamino)]silylbis(2-methylindenyl)hafnium dimethyl,
bis[(diallylamino)]silylbis(pentamethylcyclopentadienyl)hafnium dichloride,
bis[(diallylamino)]silylbis(pentamethylcyclopentadienyl)hafnium dimethyl,
bis(cyclopentadienyl)zirconium diallyl, bis(methylcyclopentadienyl)zirconium diallyl,
bis(2,3,5-trimethylcyclopentadienyl)zirconium diallyl,
(cyclopentadienyl)(pentamethylcyclopentadienyl) zirconium diallyl,
bis(methylindenyl)zirconium diallyl,
(indenyl)(2-methylindenyl)zirconium diallyl,
bis(cyclopentadienyl)hafnium diallyl,
bis(methylcyclopentadienyl)hafnium diallyl,
bis(2,3,5-trimethylcyclopentadienyl)hafnium diallyl,
(cyclopentadienyl)(pentamethylcyclopentadienyl) hafnium diallyl,
bis(methylindenyl)hafnium diallyl,
(indenyl)(2-methylindenyl)hafnium diallyl.

Preferred metallocenes include such compounds as the following:

5-(cyclopentadienyl)-5-(9-fluorenyl)1-hexene zirconium dichloride,
bis(9-fluorenyl)(methyl)(vinyl)silane zirconium dichloride,
bis(9-fluorenyl)(methyl)(prop-2-enyl)silane zirconium dichloride,
bis(9-fluorenyl)(methyl)(but-3-enyl)silane zirconium dichloride,
bis(9-fluorenyl)(methyl)(hex-5-enyl)silane zirconium dichloride,
bis(9-fluorenyl)(methyl)(oct-7-enyl)silane zirconium dichloride,
(cyclopentadienyl)(1-allylindenyl)zirconium dichloride,
bis(1-allylindenyl)zirconium dichloride,
(9-(prop-2-enyl)fluorenyl)(cyclopentadienyl)zirconium dichloride,
(9-(prop-2-enyl)fluoreny)(pentamethylcyclopentadienyl) zirconium dichloride,
bis(9-(prop-2-enyl)fluorenyl)zirconium dichloride,
(9-(cyclopent-2-enyl)fluorenyl)(cyclopentadienyl) zirconium dichloride,
bis(9-(cyclopent-2-enyl)(fluorenyl)zirconium dichloride,
5-(2-methylcyclopentadienyl)-5(9-fluorenyl)-1-hexene zirconium dichloride,
1-(9-fluorenyl)-1-(cyclopentadienyl)-1-(but-3-enyl)-1-(methyl)methane zirconium dichloride,
5-(fluorenyl)-5-(cyclopentadienyl)-1-hexene hafnium dichloride,
(9-fluorenyl)(1-allylindenyl)dimethylsilane zirconium dichloride,
1-(2,7-di(alpha-methylvinyl)(9-fluorenyl)-1-(cyclopentadienyl)-1,1-dimethylmethane zirconium dichloride,
1-(2,7-di(cyclohex-1-enyl)(9-fluorenyl)-1-(cyclopentadienyl)-1,1-methane zirconium dichloride,
5-(cyclopentadienyl)-5-(9-fluorenyl)-1-hexene titanium dichloride,
5-(methylcyclopentadienyl)-5-(9-fluorenyl)1-hexene titanium dichloride,
bis(9-fluorenyl)(methyl)(vinyl)silane titanium dichloride,
bis(9-fluorenyl)(methyl)(prop-2-enyl)silane titanium dichloride,
bis(9-fluorenyl)(methyl)(but-3-enyl)silane titanium dichloride,
bis(9-fluorenyl)(methyl)(hex-5-enyl)silane titanium dichloride,
bis(9-fluorenyl)(methyl)(oct-7-enyl)silane titanium dichloride,
(cyclopentadienyl)(1-allylindenyl)titanium dichloride,
bis(1-allylindenyl)titanium dichloride,
(9-(prop-2-enyl)fluorenyl)(cyclopentadienyl)hafnium dichloride,
(9-(prop-2-enyl)fluorenyl)(pentamethylcyclopentadienyl) hafnium dichloride,
bis(9-(prop-2-enyl)fluorenyl)hafnium dichloride,
(9-(cyclopent-2-enyl)fluorenyl)(cyclopentadienyl) hafnium dichloride,
bis(9-(cyclopent-2-enyl)(fluorenyl)hafnium dichloride,
5-(2-methylcyclopentadienyl)-5(9-fluorenyl)-1-hexene hafnium dichloride,
5-(fluorenyl)-5-(cyclopentadienyl)-1-octene hafnium dichloride,
(9-fluorenyl)(1-allylindenyl)dimethylsilane hafnium dichloride.

It will be noted that the above metallocene ingredients are metallocenes of a Group 4 metal, namely, titanium, zirconium or hafnium that preferably have two cyclopentadienyl moiety-containing groups which can be separate moieties or they can be joined together by means of a bridge such as, for example, a divalent hydrocarbyl bridge, a silicon-containing divalent bridge, or a germanium-containing divalent bridge, and in any case the metallocene contains polymerizable olefinic substitution in the molecule.

As noted above the metallocene(s) having at least one polymerizable olefinic substituent in the molecule can be used in combination with one or more metallocenes that do not contain such polymerizable olefinic substitution. These latter metallocenes are, in general, the same kind of compounds as the metallocenes described above except that they do not contain any polymerizable olefinic substitution. Thus for example these metallocenes that are devoid of polymerizable olefinic substitution contain in the molecule (A) at least one, and preferably only one, atom of a transition metal (i.e., a metal of Groups 3–10), a metal of the Lanthanide series, or a metal of the Actinide series, of the Periodic Table that is set forth on Page 27 of the Feb. 4, 1985 issue of Chemical & Engineering News; and (B) at least one cyclopentadienyl moiety-containing group, and preferably two cyclopentadienyl moiety-containing groups. When two cyclopentadienyl moiety-containing groups are present they can be unbridged or they can be connected together by a bridging group of the type such as described above.

Suitable transition metal compounds which may be used together with the metallocene include the well known Ziegler-Natta catalyst compounds of Group 4–6 metals. Non-limiting illustrative examples of such transition metals include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_3H_5)_3$, $ZrCl_4$, $ZrCl_3(OC_2H_5)$, $Zr(OC_2H_5)_4$, $ZrCl(OC_4H_9)_3$, and the like.

Olefins

In general, any polymerizable olefinic hydrocarbon or combination of polymerizable olefinic hydrocarbons can be used in the practice of this invention. Typically, they are one or more alpha-olefins having up to about 18 carbon atoms, although alpha-olefin monomers having even higher carbon atom contents may be used. A few examples include styrene, 1-pentene, 4-methyl-1-butene, 1-hexene, 4-methyl-1-pentene, 1-octene, 1-decene, 1-octadecene, and vinylcyclohexane. Preferred are vinylolefins having up to about 8 carbon atoms, and more preferred are the vinyl olefinic hydrocarbons having from 2 to 4 carbon atoms, namely ethylene, propylene and 1-butene or combinations of any two or all three of these. Combinations of ethylene or propylene with another vinyl olefinic hydrocarbon such as 1-pentene, 1-hexene or 1-octene are also suitable. Ethylene itself is the most preferred olefin for use in forming the self-supported catalysts of this invention.

Prepolymerization Solvents or Diluents

The prepolymerization is carried out in an inert anhydrous solvent, usually a hydrocarbon solvent, and preferably a solvent such as is customerily used in a Ziegler-type low-pressure olefin polymerization process. For example, the solvent can be (i) one or more aliphatic and/or cycloaliphatic hydrocarbons, or (ii) one or more aromatic hydrocarbons containing only aromatic unsaturation in the molecule, or (iii) a mixture of (i) and (ii). Examples of suitable solvents include pentane, hexane, isopentane, heptane, isohexane, isooctane, cyclohexane, methylcyclohexane, benzene, toluene, ethylbenzene, o-xylene, m-xylene, p-xylene, and mixtures of any two or more such hydrocarbons. It is also possible to use a paraffinic gasoline fraction, a hydrogenated gasoline fraction, or a hydrogenated diesel fuel fraction which has been freed of oxygen, sulfur components, and moisture. Polymerizable olefins may possibly be present in the otherwise inert solvent, but in such case the olefins present in the solvent must be acceptable as polymerized components in the prepolymeried catalyst, and the amount of such polymerizable olefins in the solvent being used should be taken in account in determining the particular ratio of olefin to metallocene that is intended to be used in the given operation.

Polymerization Processes Using Catalysts of This Invention

The heterogeneous catalysts formed in the practice of this invention can be used in polymerizations conducted as slurry processes or as gas phase processes. By "slurry" is meant that the particulate catalyst is used as a slurry or dispersion in a suitable liquid reaction medium which may be composed of one or more ancillary solvents (e.g., liquid aromatic hydrocarbons, etc.) or an excess amount of liquid monomer to be polymerized in bulk. Generally speaking, the polymerizations are conducted at one or more temperatures in the range of about 0 to about 160° C., and under atmospheric, subatmospheric, or superatmospheric conditions. Conventional polymerization adjuvants, such as hydrogen, may be employed if desired. Preferably polymerizations conducted in a liquid reaction medium containing a slurry or dispersion of a catalyst of this invention are conducted at temperatures in the range of about 40 to about 110° C. Typical liquid diluents for such processes include hexane, toluene, and like materials. Typically, when conducting gas phase polymerizations, superatmospheric pressures are used, and the reactions are conducted at temperatures in the range of about 50 to about 120° C. These gas phase polymerizations can be performed in a stirred or fluidized bed of catalyst in a pressure vessel adapted to permit the separation of product particles from unreacted gases. Thermostated ethylene, comonomer, hydrogen and an inert diluent gas such as nitrogen can be introduced or recirculated to maintain the particles at the desired polymerization reaction temperature. An aluminum alkyl such as triethylaluminum may be added as a scavenger of water, oxygen and other impurities. In such cases the aluminum alkyl is preferably employed as a solution in a suitable dry liquid hydrocarbon solvent such as toluene or xylene. Concentrations of such solutions in the range of about $5 \times 10^{-3}$ molar are conveniently used. But solutions of greater or lesser concentrations can be used, if desired. Polymer product can be withdrawn continuously or semi-continuously at a rate that maintains a constant product inventory in the reactor.

Polymers can be produced pursuant to this invention by homopolymerization of polymerizable olefins, typically 1-olefins (also known as α-olefins) such as ethylene, propylene, 1-butene, styrene, or copolymerization of two or more copolymerizable monomers, at least one of which is typically a 1-olefin. The other monomer(s) used in forming such copolymers can be one or more different 1-olefins and/or a diolefin, and/or a polymerizable acetylenic monomer. Normally, the hydrocarbon monomers used, such as 1-olefins, diolefins and/or acetylene monomers, will contain up to about 10 carbon atoms per molecule. Preferred 1-olefin monomers for use in the process include ethylene, propylene, 1-butene, 3-methyl-1-butene, 4-methyl-1-pentene, 1-hexene, and 1-octene. It is particularly preferred to use the particulate catalysts of this invention in the polymerization of ethylene, or propylene, or ethylene and at least one $C_3$–$C_8$ 1-olefin copolymerizable with ethylene. Typical diolefin monomers include 1,6-which can be used to form terpolymers with ethylene and propylene include hexadiene, norbornadiene, and similar copolymerizable diene hydrocarbons. 1-Heptyne and 1-octyne are illustrative of suitable acetylenic monomers which can be used.

Because of the higher activity and productivity of the catalysts of this invention, the amount of the present heterogeneous catalysts used in olefin polymerizations can be somewhat less than is typically used in olefin polymerizations conducted on an equivalent scale. For example, in conducting homopolymerization of ethylene in a 2-liter autoclave with a constant ethylene pressure of 450 psig, excellent results have been achieved using as little as 5 milligrams of catalyst per batch polymerization reaction. Thus in general the polymerizations and copolymerizations conducted pursuant to this invention are carried out using a catalytically effective amount of the heterogeneous catalyst, which amount may be varied depending upon the type of polymerization being conducted, the polymerization conditions being used, and the type of reaction equipment in which the polymerization is being conducted. In many cases, the amount of the catalyst used will be such as to provide in the range of about 0.000001 to about 0.01 percent by weight of transition, lanthanide, or actinide metal e.g., a Group 4 metal, based on the weight of the monomer(s) being polymerized.

After polymerization and deactivation of the catalyst in a conventional manner, the product polymer can be recovered from the polymerization reactor by any suitable means. When conducting the process with a slurry or dispersion of the catalyst in a liquid medium the product typically is recovered by a physical separation technique (e.g. decantation, etc.). The recovered polymer is usually washed with one or more suitably volatile solvents to remove residual polymerization solvent or other impurities, and then dried, typically under reduced pressure with or without addition of heat. When conducting the process as a gas phase polymerization, the product after removal from the gas phase reactor is typically freed of residual monomer by means of a nitrogen purge, and often can be used without further catalyst deactivation or catalyst removal.

When preparing polymers pursuant to this invention conditions may be used for preparing unimodal or multimodal polymer types. For example, mixtures of catalysts of this invention formed from two or more different metallocenes having different propagation and termination rate constants for ethylene polymerizations can be used in preparing polymers having broad molecular weight distributions of the multimodal type.

Productivity Determination

To determine productivity of catalyst particles the following polymerization procedure should be used: A two-liter autoclave is used to carry the polymerizations. The reactor is rinsed with 1100 grams of toluene at a temperature of at least 140° C. for at least 10 minutes. The reactor is then purged with low pressure nitrogen for 5 minutes and then evacuated under vacuum for at least one hour at >140° C. The reactor is purged and vented twice with 600 psig nitrogen and twice with one liter (about 80 psig) of isobutane. The isobutane is vented off, but a small isobutane purge on the reactor is maintained. Once the reactor has cooled to below 40° C., about 15 mg of the particulate metallocene/aluminoxane catalyst as a slurry in 2.0 mL of hexane/TEA solution is charged to the reactor against the counterflow of isobutane. The reactor is then filled with 1.0 liter of isobutane. The agitator is set to 1100 rpm and the reactor is heated to 90±2° C. (e.g., 91.5° C.). With the reactor temperature at 90±2° C. (e.g., 91.5° C.), ethylene is charged in to give a reactor pressure of 450 psig. Ethylene is polymerized for 1.0 hour. After 1.0 hour, the reactor is slowly vented and cooled. Polyethylene (PE) is removed and weighed. Productivity is calculated by using the expression:

grams PE/grams catalyst×hour.

Productivity is thus determined in the above procedure using the catalyst composition in the form of solid particles; the catalyst is not in solution.

It will be understood and appreciated that the productivity as determined by the above procedure is a property or characteristic of the particulate catalyst to be determined when the catalyst is fresh, the term "fresh" being used in the sense that the catalyst has not been previously used in a polymerization reaction. It is, of course, not necessary to test every batch of fresh catalyst for its productivity, provided the materials and conditions used for preparing the catalyst remain the same from batch to batch, and as long as there is no reason to question the productivity of any particular batch of fresh catalyst where the productivity of one or more prior batches had previously been found to be in accordance with this invention. Thus productivity is a property or inherent characteristic of the particulate catalysts of this invention which manifests itself when and if one or more samples of fresh particulate catalyst are tested for productivity.

Determination of Particle Size Distribution

The recommended equipment to be used in conducting the particle size analysis is COULTER® LS-230 Particle Size Analyzer (LS Series) with Small Volume Module Plus and a Fraunhofer PIDS (Polarization Intensity Differential Scattering) detector, and an HP Vectra VE Computer and Coulter application software, or equivalent. Available from Coulter Corporation, Hialeah, Fla.; 20-mL scintillation vials; and a drybox. The chemicals used are anhydrous n-heptane and lecithin in the form a liquid dietary supplement, which is used as a dispersant. The recommended procedure for measuring particle size using the Coulter LS-230 laser diffraction spectrometer, is as follows: The sample is suspended in heptane and added to the reservoir of a recirculating pump, so that a stream of well-dispersed particles passes continuously through a transparent sample cell. A laser beam is then projected through this cell and light scattered by the particles is measured by two optical detector arrays. The smaller particles in the distribution (0.04 to 0.4 microns) are quantified by a polarization intensity differential scattering (PIDS) method. In the PIDS technique, both vertically and horizontally polarized scattered light is measured. In addition, three different wavelengths of incident light is used in the PIDS technique. The larger particles in the distribution (0.4–2000 microns) are characterized by the angular dependence of unpolarized scattered light. The signals from both detector arrays are combined and processed by a micro-computer which calculates the particle size distribution of the sample. The computer "run info" for the procedure is set for a run length of 60 seconds and a wait length of 0 seconds with the number of runs being 4.

The Coulter LS-230 instrument uses an optical model to calculate particle size of a material based on the measured scattered light. This model must be constructed and saved by the instrument's microcomputer before samples of the material can be run. Enter the refractive index of the solvent, heptane, R.I.=1.39, and of the sample material, as measured by a microscope technique using oil immersion. Calculations of particle size results are automatically performed by the instrument's microcomputer. The Coulter LS 230 reports volume % of particles.

Determination of Specific Surface Area

To determine specific surface area of the particulate catalysts produced in the practice of this invention, the well-known BET technique is used. The BET technique (named after the inventors, Braunauer, Emmett, and Teller) consists of (1) removing adsorbed gases from the sample with heat and vacuum, (2) adsorbing a mono-layer of nitrogen on the surface at liquid nitrogen temperature, (3) measuring the amount of adsorbed nitrogen, and (4) calculating the total surface area of the sample from an assumed cross-sectional area of nitrogen molecules. The total surface area is divided by the sample weight to yield the specific surface area. Specific surface area is defined as the exposed surface area of 1 gram of the sample tested. For best results, the Coulter Model 3100 instrument (which automatically applies the BET technique), or equivalent instrument, if any, should be used.

The invention is further illustrated by, but is not intended to be limited to, the following examples. The metallocene used in these examples was 1-(9-fluorenyl)-1-(cyclopentadienyl)-1-(but-3-enyl)-1-(methyl)methane zirconium dichloride, a metallocene described in U.S. Pat. No. 5,498,581. The aluminoxane used in these examples was a 30 wt % solution of methylaluminoxane ("MAO") in toluene, a product available commercially from Albemarle Corporation.

The general procedure used in the examples simulates a semi-continuous operation. In essence the procedure, which is conducted under an anhydrous inert atmosphere, involves the following steps:

1. The reaction vessel is charged with 0.4 liters of the solvent, and the solvent is cooled to 15° C.
2. The Metallocene is dissolved in 30 wt % MAO in toluene and the solution is transferred to a feed vessel.
3. The solvent is presaturated with ethylene at 5–10 psig.
4. Metallocene/MAO solution is slowly fed to the reaction vessel at a rate designed to maintain a relatively constant ratio of Metallocene/MAO:ethylene which will allow the feed of the total Metallocene/MAO charge to be completed in 5 to 100 minutes before the total feed of ethylene has been completed.
5. During the feeding of the Metallocene/MAO charge, ethylene is fed to the reaction vessel to maintain a constant pressure of 5–10 psig.
6. The resultant prepolymerized catalyst slurry is withdrawn from the reaction vessel. The slurry is filtered, washed, and the particulate solids are dried.

EXAMPLE 1

Toluene solvent (353.8 grams) was charged to the reactor and cooled to 15° C. In a separate vessel, Metallocene (0.782 gram) was dissolved in 78.6 grams of 30 wt % MAO in toluene and transferred to the feed vessel. The temperature of the feed vessel was maintained at 23° C. The chilled toluene was presaturated in the reactor with ethylene at 5 psig. The entire amount of MAO/Metallocene was fed to the reaction mixture over a 230-minute period while concurrently maintaining the ethylene at a constant pressure of 5–10 psig. The total ethylene prepolymerization time was 288 minutes. The total ethylene charge was 31.6 grams. When tested for productivity as described above, the prepolymerized catalyst formed in this example had a productivity of 27,900 grams of polyethylene per gram of catalyst per hour. The polyethylene produced in the productivity determination was bimodal in character with the majority of the particles being greater than 2000 microns in size with some particles in the range of 100 microns. The bulk density of the polymer was 0.27 gram/cc.

EXAMPLE 2

Toluene solvent (349.9 grams) was charged to the reactor and cooled to 15° C. In a separate vessel, Metallocene (0.897 gram) was dissolved in 82.0 grams of 30 wt % MAO in toluene and transferred to the feed vessel. The temperature of the feed vessel was maintained at 23° C. The chilled toluene was presaturated in the reactor with ethylene at 5 psig. The entire amount of MAO/Metallocene was fed to the reaction mixture over a 90-minute period while maintaining the ethylene at a constant pressure of 5–10 psig. The total ethylene prepolymerization time was 240 minutes. The total ethylene charge was 32.1 grams. When tested for productivity as described above, the prepolymerized catalyst formed in this example had a productivity of 27,000 grams of polyethylene per gram of catalyst per hour. The polyethylene produced in the productivity determination had an average particle size of 250 microns, and its morphology was judged to be good. The bulk density of the polymer was 0.36 gram/cc.

EXAMPLE 3

Isopentane solvent (400 mL) was charged to the reactor, and cooled to 15° C. In a separate vessel, Metallocene (0.767 gram) was dissolved in 46.8 grams of 30 wt % MAO in toluene and transferred to the feed vessel. The temperature of the feed vessel was maintained at 23° C. The chilled isopentane was presaturated in the reactor with ethylene at 10 psig. The entire amount of MAO/Metallocene was fed to the reaction mixture over a 220-minute period while maintaining the ethylene at a constant pressure of 5–10 psig. The total ethylene prepolymerization time was 280 minutes. The total ethylene charge was 35.5 grams. When tested for productivity as described above, the prepolymerized catalyst formed in this example had a productivity of 28,300 grams of polyethylene per gram of catalyst per hour. The polyethylene produced in the productivity determination had an average particle size of 250 microns, and its morphology was judged to be good. The bulk density of the polymer was 0.34 gram/cc.

EXAMPLE 4

Isohexane solvent (400 mL) was charged to the reactor and cooled to 15° C. In a separate vessel, Metallocene (0.955 gram) was dissolved in 66.8 grams of 30 wt % MAO in toluene and transferred to the feed vessel. The temperature of the feed vessel was maintained at 23° C. The chilled isohexane was presaturated in the reactor with ethylene at 6–10 psig. The entire amount of MAO/Metallocene was fed to the reaction mixture over a 210-minute period while maintaining the ethylene at a constant pressure of 5–10 psig. The total ethylene prepolymerization time was 290 minutes. The total ethylene charge was 53.9 grams. When tested for productivity as described above, the prepolymerized catalyst formed in this example had a productivity of 13,900 grams of polyethylene per gram of catalyst per hour. The polyethylene produced in the productivity determination had an average particle size of 500 microns, and its morphology was judged to be good. The bulk density of the polymer was 0.36 gram/cc.

EXAMPLE 5

Isohexane solvent (400 mL) was charged to the reactor and cooled to 15° C. In a separate vessel, Metallocene (0.932 gram) was dissolved in 66.5 grams of 30 wt % MAO in toluene and transferred to the feed vessel. The temperature of the feed vessel was maintained at 23° C. The chilled isohexane was presaturated in the reactor with ethylene at 6–10 psig. The entire amount of MAO/Metallocene was fed to the reaction mixture over a 215-minute period while maintaining the ethylene at a constant pressure of 5–10 psig. The total ethylene prepolymerization time was 270 minutes. The total ethylene charge was 47.3 grams. When tested for productivity as described above, the prepolymerized catalyst formed in this example had a productivity of 17,900 grams of polyethylene per gram of catalyst per hour. The polyethylene produced in the productivity determination had an average particle size of 500 microns, and its morphology was judged to be good. The bulk density of the polymer was 0.34 gram/cc.

EXAMPLE 6

Isohexane solvent (400 mL) was charged to the reactor and cooled to 15° C. In a separate vessel, Metallocene (0.709 gram) was dissolved in 46.1 grams of 30 wt % MAO in toluene and transferred to the feed vessel. The temperature of the feed vessel was maintained at 23° C. The chilled isohexane was presaturated in the reactor with ethylene at 6–10 psig. The entire amount of MAO/Metallocene was fed to the reaction mixture over a 170-minute period while maintaining the ethylene at a constant pressure of 5–10 psig. The total ethylene prepolymerization time was 195 minutes. The total ethylene charge was 37.0 grams. When tested for productivity as described above, the prepolymerized catalyst formed in this example had a productivity of 21,700 grams of polyethylene per gram of catalyst per hour. The morphology of the polyethylene produced was judged to be good. The bulk density of the polymer was 0.36 gram/cc.

EXAMPLE 7

Isohexane solvent (400 mL) was charged to the reactor and cooled to 15° C. In a separate vessel, Metallocene (0.713 gram) was dissolved in 46.7 grams of 30 wt % MAO in toluene and transferred to the feed vessel. The temperature of the feed vessel was maintained at 23° C. The chilled isohexane was presaturated in the reactor with ethylene at 7–8 psig. The entire amount of MAO/Metallocene was fed to the reaction mixture over a 171-minute period while maintaining the ethylene at a constant pressure of 5–10 psig. The total ethylene prepolymerization time was 196 minutes. The total ethylene charge was 36.0 grams. When tested for productivity as described above, the prepolymerized catalyst formed in this example had a productivity of 25,000 grams of polyethylene per gram of catalyst per hour. The polyethylene produced in the productivity determination had an average particle size of 500 microns, and its morphology was judged to be good. The bulk density of the polyethylene was 0.36 gram/cc.

EXAMPLE 8

Isohexane solvent (400 mL) was charged to the reactor and cooled to 15° C. In a separate vessel, Metallocene (0.954 gram) was dissolved in 65.1 grams of 30 wt % MAO in toluene and transferred to the feed vessel. The temperature of the feed vessel was maintained at 23° C. The chilled isohexane was presaturated in the reactor with ethylene at 8 psig. The entire amount of MAO/Metallocene was fed to the reaction mixture over a 213-minute period while maintaining the ethylene at a constant pressure of 5–10 psig. The total ethylene prepolymerization time was 230 minutes. The total ethylene charge was 53.4 grams. When tested for productivity as described above, the prepolymerized catalyst formed in this example had a productivity of 25,000 grams of polyethylene per gram of catalyst per hour. The polyethylene produced in the productivity determination had an average particle size of 250 microns, and its morphology was judged to be good. The polyethylene produced had a bulk density of 0.36 gram/cc.

EXAMPLE 9

Isohexane solvent (400 mL) was charged to the reactor and cooled to 5° C. In a separate vessel, Metallocene (0.912 gram) was dissolved in 61.9 grams of 30 wt % MAO in toluene and transferred to the feed vessel. The temperature of the feed vessel was maintained at 23° C. The chilled isohexane was presaturated in the reactor with ethylene at 8–10 psig. The entire amount of MAO/Metallocene was fed to the reaction mixture over a 435-minute period while maintaining the ethylene at a constant pressure of 5–10 psig. The total ethylene prepolymerization time was 455 minutes. The total ethylene charge was 52.0 grams. When tested for productivity as described above, the prepolymerized catalyst formed in this example had a productivity of 24,000 grams of polyethylene per gram of catalyst per hour. The polyethylene produced in the productivity determination had an average particle size of 250 microns, and its morphology was judged to be good. The polyethylene produced had a bulk density of 0.33 gram/cc.

EXAMPLE 10

Isohexane solvent (400 mL) was charged to the reactor and cooled to 15° C. In a separate vessel, Metallocene (0.706 gram) was dissolved in 46.8 grams of 30 wt % MAO in toluene and transferred to the feed vessel. The temperature of the feed vessel was maintained at 0° C. The chilled isohexane was presaturated in the reactor with ethylene at 7–8 psig. The entire amount of MAO/Metallocene was fed to the reaction mixture over a 203-minute period while maintaining the ethylene at a constant pressure of 5–10 psig. The total ethylene prepolymerization time was 230 minutes. The total ethylene charge was 35.9 grams. When tested for productivity as described above, the prepolymerized catalyst formed in this example had a productivity of 24,400 grams of polyethylene per gram of catalyst per hour. The polyethylene produced in the productivity determination had an average particle size of 500 microns, its morphology was judged to be good, and its bulk density was 0.37 grams/cc.

The following Comparative Example illustrates the disadvantages of failing to concurrently feed the catalyst components and the olefin being used in the prepolymerization.

COMPARATIVE EXAMPLE

Isopentane solvent (400 mL) was charged to the reactor and cooled to 15° C. In a separate vessel, Metallocene (0.618 gram) was dissolved in 44.7 grams of 30 wt % MAO in toluene and transferred to the feed vessel. The temperature of the feed vessel was maintained at 23° C. The solution in the feed vessel was fed to the isopentane and thereafter ethylene at 5–8 psig was introduced into the reactor. Then the reaction mixture was maintained over a 58-minute period at a constant ethylene pressure of 5–10 psig. The total ethylene prepolymerization time was 420 minutes. The total ethylene charge was 45.3 grams. When tested for productivity as described above, the prepolymerized catalyst formed in this example had a productivity of 4,353 grams of polyethylene per gram of catalyst per hour, having a bulk density of 0.36 gram/cc. The average polymer size was 850 microns.

The particle size data for the products produced in Examples 3–10 using the procedure described above is summarized in the Table. The values given in the Table are in microns. The percentages are volume percentages. Thus, for example, the values in microns given in the column headed "90%" indicate that 90 percent by volume of the total prepolymerized catalyst had a particle size less than the micron size shown in the Table. Consequently, 10% by volume of the total prepolymerized catalyst had a particle size equal to or greater than the same micron size shown in the Table.

| Ex. | Avg. | 90% | 75% | 50% | 25% | 10% | Max. | Mean/Median Ratio |
|---|---|---|---|---|---|---|---|---|
| 3 | 44.24 | 61.57 | 55.04 | 47.55 | 39.72 | 17.41 | ca.100 | 0.930 |
| 4 | 41.87 | 69.51 | 58.54 | 39.34 | 27.02 | 11.01 | ca.250 | 1.064 |
| 5 | 29.39 | 53.06 | 39.80 | 27.67 | 17.11 | 1.066 | ca.200 | 1.062 |
| 6 | 31.70 | 59.11 | 47.13 | 32.56 | 14.16 | 0.876 | ca.100 | 0.974 |
| 7 | 28.80 | 51.88 | 41.67 | 29.28 | 15.79 | 0.924 | ca.90 | 0.984 |
| 8 | 22.73 | 43.17 | 32.01 | 21.77 | 12.86 | 0.693 | ca.80 | 1.044 |
| 9 | 38.46 | 73.53 | 52.09 | 33.69 | 20.21 | 2.192 | ca.210 | 1.142 |
| 10 | 26.43 | 51.53 | 38.17 | 23.80 | 11.68 | 1.024 | ca.200 | 1.110 |

It is to be understood that the ingredients referred to by chemical name or formula anywhere in the specification or claims hereof, whether referred to in the singular or plural, are identified as they exist prior to coming into contact with another substance referred to by chemical name or chemical type (e.g., another reactant, a solvent, a diluent, or etc.). It matters not what preliminary chemical changes, transformations and/or reactions, if any, take place in the resulting mixture or solution or reaction medium as such changes, transformations and/or reactions are the natural result of bringing the specified reactants and/or components together under the conditions called for pursuant to this disclosure. Thus the reactants and other materials are identified as ingredients to be brought together in connection with performing a desired chemical reaction or in forming a mixture to be used in conducting a desired reaction. Accordingly, even though the claims hereinafter, may refer to substances, components and/or ingredients in the present tense ("comprises", "is", etc.), the reference is to the substance or ingredient as it existed at the time just before it was first contacted, blended or mixed with one or more other substances or ingredients in accordance with the present disclosure. The fact that the substance or ingredient may have lost its original identity through a chemical reaction or transformation or complex formation or assumption of some other chemical form during the course of such contacting, blending or mixing operations, is thus wholly immaterial for an accurate understanding and appreciation of this disclosure and the claims thereof. Nor does reference to an ingredient by chemical name or formula exclude the possibility that during the desired reaction itself an ingredient becomes transformed to one or more transitory intermediates that actually enter into or otherwise participate in the reaction. In short, no representation is made or is to be inferred that the named ingredients must participate in the reaction while in their original chemical composition, structure or form.

Each and every patent or other publication or published document referred to in any portion of this specification is incorporated in toto into this disclosure by reference, as if fully set forth herein.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

That which is claimed is:

1. A process which comprises concurrently feeding:
   a) separate continuous or substantially continuous feeds of (i) at least one polymerizable vinylolefin, and (ii) a solution in an organic liquid solvent of at least one metallocene and at least one aluminoxane and/or at least one metallocene-aluminoxane reaction product; or
   b) separate continuous or substantially continuous feeds of (i) at least one polymerizable vinylolefin, (iii) at least one metallocene optionally in an organic liquid solvent or diluent, and (iv) at least one aluminoxane optionally in an organic liquid solvent or diluent; or
   c) separate continuous or substantially continuous feeds of (i) and (ii) and at least one of (iii) and (iv) into a liquid reaction medium containing solvent and at least one vinylolefin, such that particles of catalytically-active, prepolymerized, self-supported olefin polymerization catalyst composition are formed in said reaction medium, the metallocene used as the feed or in making up the feed having in the molecule at least one polymerizable olefinic substituent, and wherein said catalytically-active, prepolymerized, self-supported olefin polymerization catalyst composition has a productivity, when fresh and if tested in slurry form for productivity with ethylene in a 2-liter autoclave that has been precharged with about one liter of isobutane and that is charged with ethylene to a total pressure of 450 psig at 90±2° C., of at least 13,900 grams of polyethylene per gram of catalyst in one hour.

2. A process according to claim 1 wherein said vinylolefin is a gaseous 1-alkene, and wherein said metallocene used as the feed or in making up the feed has only one atom of a transition, lanthanide, or actinide metal in the molecule.

3. A process according to claim 2 wherein said separate feeds are proportioned such that the mole ratio of gaseous 1-alkene to said metallocene fed into the liquid reaction medium is maintained in the range of about 150:1 to about 1500:1.

4. A process according to claim 2 wherein the atom ratio of aluminum to transition, lanthanide, or actinide metal fed into the liquid reaction medium is in the range of about 50:1 to about 1500:1.

5. A process according to claim 2 wherein said separate feeds are proportioned such that the mole ratio of gaseous 1-alkene to said metallocene fed into the liquid reaction medium is maintained in the range of about 150:1 to about 1500:1, and wherein the atom ratio of aluminum to transition, lanthanide, or actinide metal fed into the liquid reaction medium is in the range of about 50:1 to about 1500:1.

6. A process according to claim 2 wherein said metallocene is a Group 4 metallocene.

7. A process according to claim 2 wherein said metallocene is a zirconium metallocene.

8. A process according to claim 2 wherein said aluminoxane is a methylaluminoxane.

9. A process according to claim 2 wherein said metallocene is a Group 4 metallocene, and wherein said aluminoxane is a methylaluminoxane.

10. A process according to claim 2 wherein said metallocene is a zirconium metallocene, and wherein said aluminoxane is a methylaluminoxane.

11. A process according to any of claims 2–10 wherein said gaseous 1-alkene is ethylene.

12. A process according to claim 2 wherein said metallocene is a Group 4 metallocene, wherein said aluminoxane is a methylaluminoxane, and wherein said gaseous 1-alkene is ethylene.

13. A process according to claim 2 wherein said metallocene is a zirconium metallocene, wherein said aluminoxane is a methylaluminoxane, and wherein said gaseous 1-alkene is ethylene.

14. A process which comprises concurrently feeding separate continuous or substantially continuous feeds of (a) at least one polymerizable vinylolefin, and (b) a solution in an organic liquid solvent of at least one metallocene and at least one aluminoxane and/or at least one metallocene-aluminoxane reaction product into a liquid reaction medium containing solvent and at least one vinylolefin, such that particles of catalytically-active, prepolymerized, self-supported olefin polymerization catalyst composition are formed in said reaction medium, the metallocene or at least one of the metallocenes used in forming the solution of (b) having in the molecule at least one polymerizable olefinic substituent and a single atom of a transition, lanthanide, or actinide metal, and wherein said catalytically-active, prepolymerized, self-supported olefin polymerization catalyst composition has a productivity, when fresh and if tested in slurry form for productivity with ethylene in a 2-liter autoclave that has been precharged with about one liter of isobutane and that is charged with ethylene to a total pressure of 450 psig at 90±2° C., above 13,900 grams of polyethylene per gram of catalyst in one hour.

15. A process according to claim 14 wherein said vinylolefin is a gaseous 1-alkene.

16. A process according to claim 15 wherein said separate feeds are proportioned such that the mole ratio of gaseous 1-alkene to said metallocene fed into the liquid reaction medium is maintained in the range of about 150:1 to about 1500:1.

17. A process according to claim 15 wherein the atom ratio of aluminum to transition, lanthanide, or actinide metal in the solution of (b) is in the range of about 50:1 to about 1500:1.

18. A process according to claim 15 wherein said separate feeds are proportioned such that the mole ratio of gaseous 1-alkene to said metallocene fed into the liquid reaction medium is maintained in the range of about 150:1 to about 1500:1, and wherein the atom ratio of aluminum to transition, lanthanide, or actinide metal fed into the liquid reaction medium is in the range of about 100:1 to about 1500:1.

19. A process according to claim 15 wherein said metallocene is a Group 4 metallocene.

20. A process according to claim 15 wherein said metallocene is a zirconium metallocene.

21. A process according to claim 15 wherein said aluminoxane is a methylaluminoxane.

22. A process according to claim 15 wherein said metallocene is a Group 4 metallocene, and wherein said aluminoxane is a methylaluminoxane.

23. A process according to claim 15 wherein said metallocene is a zirconium metallocene, and wherein said aluminoxane is a methylaluminoxane.

24. A process according to any of claims 15–23 wherein said gaseous 1-alkene is ethylene.

25. A process according to claim 15 wherein said metallocene is a Group 4 metallocene, wherein said aluminoxane is a methylaluminoxane, and wherein said gaseous 1-alkene is ethylene.

26. A process according to claim 15 wherein said metallocene is a zirconium metallocene, wherein said aluminoxane is a methylaluminoxane, and wherein said gaseous 1-alkene is ethylene.

27. A process according to claim 26 wherein the particle size of at least 75 volume percent of said catalytically-active, prepolymerized, self-supported olefin polymerization catalyst composition is in the range of about 10 to about 100 microns.

28. A process according to claim 15 wherein said metallocene is a Group 4 metallocene, wherein said separate feeds are proportioned such that the mole ratio of gaseous 1-alkene to said metallocene fed into the liquid reaction medium is maintained in the range of about 150:1 to about 1500:1, wherein the atom ratio of aluminum to Group 4 metal in said solution of (ii) is in the range of about 50:1 to about 1500:1, and wherein the temperature of the liquid reaction medium is below about 30° C. during substantially the entire reaction period.

29. A process according to claim 28 wherein said gaseous 1-alkene is ethylene.

30. A process according to claim 29 wherein said metallocene is a zirconium metallocene, and wherein said aluminoxane is a methylaluminoxane.

31. A process according to claim 1 wherein said concurrent feeds are into a single stand-alone reactor.

32. A process according to claim 15 wherein said concurrent feeds are into a single stand-alone reactor.

33. A process according to claim 32 wherein in staring up said process in said stand-alone reactor, said stand-alone reactor is initially charged with an initial start-up quantity of a liquid reaction medium containing polymerizable gaseous 1-alkene, and then said concurrent feeds arm initiated.

34. A process according to claim 33 wherein when said stand-alone reactor has been filled to a level, the feeding of at least the solution of (b) is terminated.

35. A process according to claim 34 wherein the polymerizable gaseous 1-alkene of (a) is fed or is continued to be fed after termination of the feeding of the solution of (b) until a total amount of said gaseous 1-alkene has been introduced into said stand-alone reactor, and then further feeding of the polymerizable gaseous 1-alkene of (a) is discontinued.

36. A process according to claim 32 wherein when said stand-alone reactor has been filled to a level, the feeding of at least the solution of (b) is terminated.

37. A process according to claim 36 wherein the polymerizable gaseous 1-alkene of (a) is fed or is continued to be fed after termination of the feeding of the solution of (b) until a total amount of said gaseous 1-alkene has been introduced into said stand-alone reactor, and then further feeding of the polymerizable gaseous 1-alkene of (a) is discontinued.

38. A process according to claim 1 wherein said concurrent continuous or substantially continuous feeds are into a first reactor of a series of at least two reactors connected in series such that when one such reactor becomes filled to a predetermined level with the reaction mixture and said concurrent feeds into the first reactor are being continued, reaction mixture is transferred to another reactor connected downstream from said first reactor in said series of reactors.

39. A process according to claim 15 wherein said concurrent feeds are into a first reactor of a series of at least two reactors connected in series such that when one such reactor becomes filled to a level with the reaction mixture and said concurrent feeds into the first reactor are being continued, reaction mixture is transferred to another reactor connected downstream from said first reactor in said series of reactors.

40. A process according to claim 39 wherein in starting up said process in said first reactor said first reactor is initially charged with a quantity of liquid reaction medium containing polymerizable gaseous 1-alkene, and then said concurrent feeds are initiated.

41. A process according to claim 40 wherein when the last reactor of the series of reactors being filled by transfer from an upstream reactor has been filled to a level, the feeding of at least the solution of (b) to said first reactor is terminated.

42. A process according to claim 41 wherein after termination of the feeding of the solution of (b), the polymerizable gaseous 1-alkene of (a) is fed or is continued to be fed to said first reactor until a total amount of said gaseous 1-alkene has been introduced into said first reactor, and then further feeding of the polymerizable gaseous 1-alkene of (a) is discontinued.

43. A process according to claim 39 wherein when the last reactor of the series of reactors being filled by transfer from an upstream reactor has been filled to a level, the feeding of at least the solution of (b) to said first reactor is terminated.

44. A process according to claim 43 wherein after termination of the feeding of the solution of (b), the polymerizable gaseous 1-alkene of (a) is fed or is continued to be fed to said first reactor until a total amount of said gaseous 1-alkene has been introduced into said first reactor, and then further feeding of the polymerizable gaseous 1-alkene of (a) is discontinued.

45. A process according to claim 38 wherein reaction medium and particles of catalytically-active, prepolymerized, self-supported olefin polymerization catalyst composition are periodically and/or continuously removed from a downstream reactor of said series of reactors at a rate enabling said concurrent feeds to said first reactor to be maintained.

46. A process according to claim 39 wherein reaction medium and particles of catalytically-active, prepolymerized, self-supported olefin polymerization catalyst composition are periodically and/or continuously removed from a downstream reactor of said series of reactors at a rate enabling said concurrent feeds to said first reactor to be maintained.

47. A process according to any of claims 33–46 wherein said gaseous 1-alkene is ethylene.

48. A continuous process of forming particles of catalytically-active, prepolymerized, self-supported olefin polymerization catalyst composition, which process comprises:

A) concurrently feeding separate continuous or substantially continuous feeds of (a) at least one polymerizable vinylolefin, and (b) a solution in an organic liquid solvent of at least one metallocene and at least one aluminoxane and/or at least one metallocene-aluminoxane reaction product into a liquid reaction medium in a reaction zone containing solvent and at least one vinylolefin, such that particles of catalytically-active, prepolymerized, self-supported olefin polymerization catalyst composition are formed in said reaction medium, the metallocene or at least one of the metallocenes used in forming the solution of (b) having in the molecule at least one polymerizable olefinic substituent and a single atom of a transition, lanthanide, or actinide metal, and wherein said catalytically-active, prepolymerized, self-supported olefin polymerization catalyst composition has a productivity, when fresh and if tested in slurry form for productivity with ethylene in a 2-liter autoclave that has been precharged with about one liter of isobutane and that is charged with ethylene to a total pressure of 450 psig at 90±2° C., of at least 13,900 grams of polyethylene per gram of catalyst in one hour; and B) periodically and/or continuously withdrawing from the reaction zone an amount of the reaction medium and said particles of catalytically-active, prepolymerized, self-supported olefin polymerization catalyst composition at a rate sufficient to enable the concurrent feeding in A) to be maintained.

49. A process according to claim 48 wherein said vinylolefin is a gaseous 1-alkene.

50. A process according to claim 48 wherein in starting up said process said reaction zone is initially charged with a quantity of liquid reaction medium containing polymerizable gaseous 1-alkene, and then said concurrent feeds are initiated.

51. A process according to claim 48 wherein in B) said amount of the reaction medium and said particles of catalytically-active, prepolymerized, self-supported olefin polymerization catalyst composition is continuously withdrawn from the reaction zone.

52. A process according to any of claims 49–51 wherein said 1-olefin is ethylene.

53. A process according to any of claims 49–51 wherein said metallocene is a Group 4 metallocene, wherein said separate feeds are proportioned such that the mole ratio of gaseous 1-alkene to said Group 4 metallocene fed into the liquid reaction medium is maintained in the range of about 150:1 to about 1500:1, and wherein the atom ratio of aluminum to Group 4 metal in said solution of (b) is in the range of about 50:1 to about 1500:1.

54. A process according to any of claims 49–51 wherein said 1-olefin is ethylene, wherein said metallocene is a zirconium metallocene, wherein said aluminoxane is a methylaluminoxane, wherein said separate feeds are proportioned such that the mole ratio of ethylene to said zirconium metallocene fed into the liquid reaction medium is maintained in the range of about 150:1 to about 1500:1, wherein the atom ratio of aluminum to zirconium in said solution of (b) is in the range of about 100:1 to about 1500:1, and wherein the temperature of the liquid reaction medium is below about 30° C. during substantially the entire reaction period.

* * * * *